(12) United States Patent
Wan et al.

(10) Patent No.: US 7,870,292 B2
(45) Date of Patent: Jan. 11, 2011

(54) NETWORK NODE AND ASSOCIATED METHODOLOGY OF EXPANDING A NETWORK TOPOLOGY THROUGH PEER SELECTION

(75) Inventors: Haoyi Wan, Yokohama (JP); Norihiro Ishikawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/584,269

(22) PCT Filed: Dec. 24, 2004

(86) PCT No.: PCT/JP2004/019411

§ 371 (c)(1),
(2), (4) Date: Apr. 10, 2007

(87) PCT Pub. No.: WO2005/062549

PCT Pub. Date: Jul. 7, 2005

(65) Prior Publication Data

US 2008/0016224 A1 Jan. 17, 2008

(30) Foreign Application Priority Data

Dec. 24, 2003 (JP) ............................. 2003-427892

(51) Int. Cl.
*G06F 15/173* (2006.01)
(52) U.S. Cl. ..................................................... 709/241
(58) Field of Classification Search .................. 709/238, 709/241, 243
See application file for complete search history.

(56) References Cited

U.S. PATENT DOCUMENTS

| 6,363,319 | B1 * | 3/2002 | Hsu ............................ 701/202 |
| 7,039,701 | B2 * | 5/2006 | Wesley ........................ 709/224 |
| 7,643,408 | B2 * | 1/2010 | Atkinson et al. ............. 370/217 |
| 2002/0147771 | A1 * | 10/2002 | Traversat et al. ............ 709/203 |
| 2003/0002521 | A1 * | 1/2003 | Traversat et al. ............ 370/465 |
| 2003/0012216 | A1 | 1/2003 | Novaes |

(Continued)

FOREIGN PATENT DOCUMENTS

JP      2003 304277      10/2003

(Continued)

OTHER PUBLICATIONS

Liu et al; "AOTO: Adaptive Overlay Topology Optimization in Unstructured P2P Systems"; Dec. 4, 2003; IEEE Globecom 2003; vol. 7; pp. 4186-4190.*

(Continued)

*Primary Examiner*—Asad M Nawaz
*Assistant Examiner*—Jeffrey Nickerson
(74) *Attorney, Agent, or Firm*—Oblon, Spivak, McClelland, Maier & Neustadt, L.L.P.

(57) ABSTRACT

The network topology generation method can reduce a network delay fairly and minimally, upon generating a new network topology, by considering a network condition in a physical layer. The network topology generation method includes establishing a virtual connection between the new node and each of the plurality of nodes; calculating an average metric value of routes from the new node to the plurality of nodes via each of the virtual connections; and establishing a connection between the new node and the node to which the virtual connection having the smallest average metric value is established, so that the new node joins the network.

8 Claims, 11 Drawing Sheets

U.S. PATENT DOCUMENTS

2004/0264466 A1* 12/2004 Huang .................. 370/392
2005/0060429 A1*  3/2005 Massoulie et al. ........... 709/243

FOREIGN PATENT DOCUMENTS

JP    2004 258747    9/2004
JP    2005 73067     3/2005

OTHER PUBLICATIONS

D. D Bernstein, Z. Feng, B. Levine, and S. Zilberstein, "Adaptive peer selection," in Proceedings of International Workshop on Peer-to-Peer Systems (IPTPS), Berkeley, CA, USA, Feb. 2003. pp. 1-6.*

Kim et al; "Node selection for a fault-tolerant streaming service on a peer-to-peer network"; Multimedia and Expo, 2003. ICME '03. Proceedings. 2003 International Conference on, vol. 2 (2003), pp. II-117-120.*

Ng et al; "Measurement-Based Optimization Techniques for Bandwidth-Demanding Peer-to-Peer Systems"; INFOCOM 2003. Twenty-Second Annual Joint Conference of the IEEE Computer and Communications Societies. IEEE, vol. 3 (2003), pp. 2199-2209 vol. 3.*

Chatterjee et al; "A Weight Based Distributed Clustering Algorithm for Mobile ad hoc Networks"; 2000; Lecture Notes in Computer Science, vol. 1970; Proceedings of the 7th International Conference on High Performance Computing; pp. 511-521.*

Guyon et al; "An Introduction to Variable and Feature Selection"; 2003; Journal of Machine Learning Research; vol. 3; pp. 1157-1182.*

Li et al; "Efficient Distributed Path Selection for Shared Restoration Connections"; Nov. 7, 2002; in: Infocom 2002. Twenty-First Annual Joint Conference of the IEEE Computer and Communications Societies; vol. 1; pp. 140-149.*

Bettstetter, Christian; "On the Minimum Node Degree and Connectivity of a Wireless Multihop Network"; 2002; in MobiHoc '02: Proceedings of the 3rd ACM International Symposium on Mobile Ad Hoc Networking & Computing, pp. 80-91.*

Gotou, Yoshihiro et al.,"Methods on Logical Network Constructions in Peer-to-Peer Services Based on Traffic Measurements", Technical Report of IEICE, vol. 101, No. 636, pp. 42-49, 2002.

Wan, Haoyi et al.,"Autonomous Topology Optimization and Recovery for Peer-to-Peer Networks", IPSJ SIG Technical Report, vol. 2004, No. 22, pp. 92-99, 2004.

Kato, Takeshi et al.,"Jupiter: Peer-to-Peer Networking Platform Toward Ubiquitous Communications", IPSJ SIG Technical Report, vol. 2003, No. 115, pp. 84-91, 2003.

Lv, Qin et al.,"Can Heterogeneity Make Gnutella Scalable?", Electronic Proceeding for the $1^{st}$. International Workshop on Peer-to-Peer Systems, 2002.

Ishikawa, Norihiro et al.,"Semantic Content Search in P2P Networks Based on RDF Schema", 2003 IEEE Pacific Rim Conference on Communications, Computers, and Signal Processing, vol. 1, pp. 142-149, 2003.

Matsumoto, Nobutaka et al.,"An Interest-Oriented Bootstrap Method for Large-Scale Networked Virtual Environments", Technical Report of IEICE in 2002-42, vol. 102, No. 214, pp. 1-8, 2002.

Kwangwook Shin et al: "Grapes: topology-based hierarchical virtual network for peer-to-peer lookup services" Parallel Processing Workshops, 2002. Proceedings. International Conference on Aug. 18-21, 2002. Piscataway, NJ, USA, IEEE, Aug. 18, 2002, pp. 159-165, XP010608444ISBN: 978-0-7695-1680-6.

Banerjee S et al: "Service adaptive multicast for media distribution networks" Internet Applications. WIAPP 2003. Proceedings. The Third IEEE Workshop on Jun. 23-24, 2003, Piscataway, NJ, USA, IEEE LNKD-D01:10. 1109/WIAPP.2003.1210286, Jun. 23, 2003, pp. 50-60, XP010643755ISBN: 978-0-7695-1972-2.

Tim Hsin-Ting Hu et al: "General clusters in peer-to-peer networks" Networks, 2003. ICON2003. The $11^{th}$ IEEE International Conference on Sep. 28-Oct. 1, 2003, Piscataway, NJ, USA, IEEE, Sep. 28, 2003, pp. 277-282, XP010683538ISBN: 978-0-7803-7788-2.

Office Action issued Sep. 27, 2010 in European Application No. 04-807767.1 (7 pages).

* cited by examiner

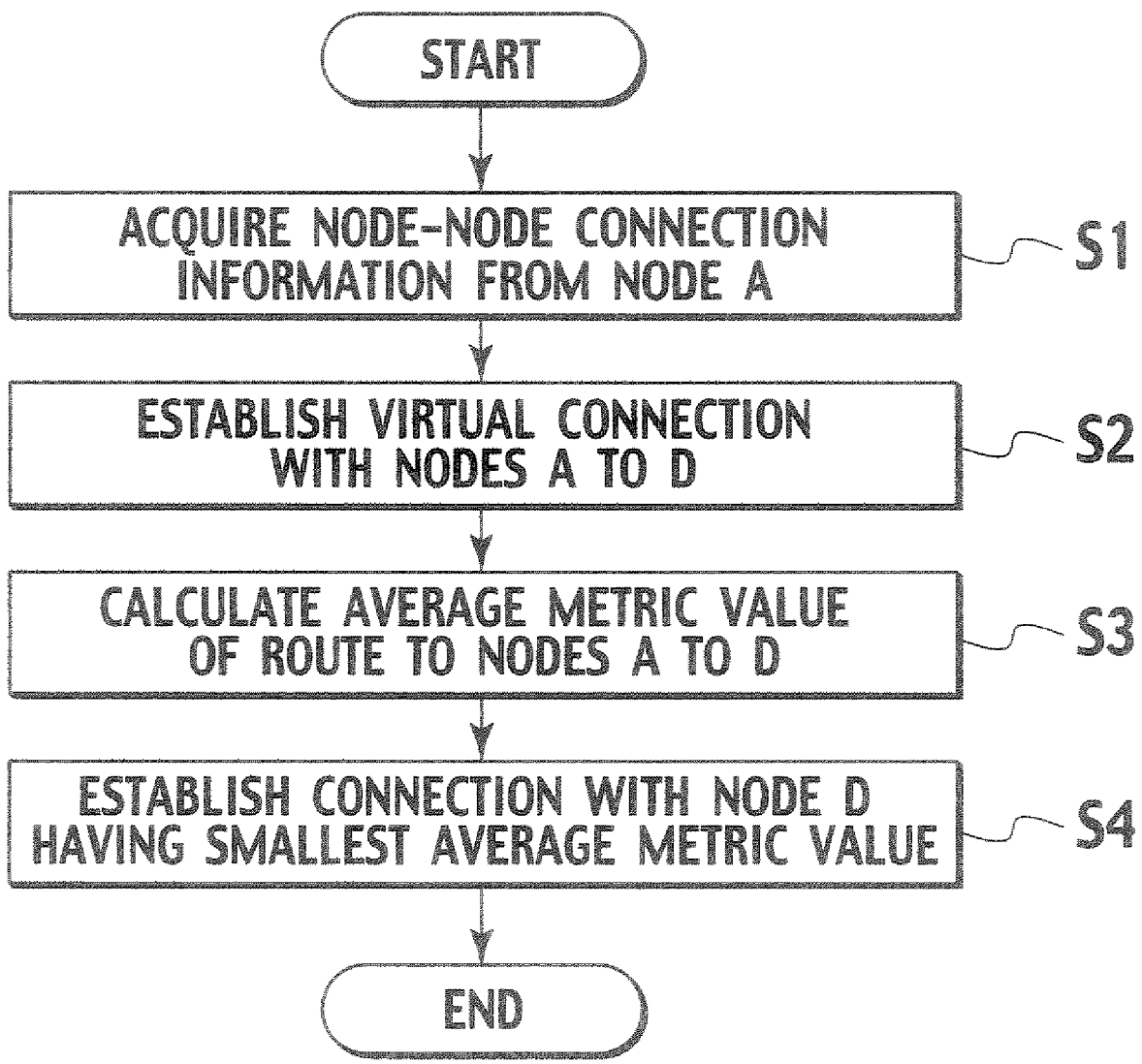

| NODE NAME | NODE ADDRESS | METRIC VALUE | THE NUMBER OF NODES |
|---|---|---|---|
| NODE B | BIP | 2 | 2 |
| NODE C | CIP | 3 | 2 |
| NODE D | DIP | 2 | 3 |

FIG. 11

| NODE NAME | METRIC VALUE | THE NUMBER OF NODES | ROUTE NAME |
|---|---|---|---|
| NODE D | 1 | 3 | #D1 |
| NODE A | 1+2 | 0 | #A1 |
| NODE B | 1+2+2 | 2 | #B1 |
| NODE C | 1+2+3 | 2 | #C1 |

FIG. 12

| NODE NAME | METRIC VALUE | THE NUMBER OF NODES | ROUTE NAME |
|---|---|---|---|
| NODE A | 5 | 0 | #A2 |
| NODE D | 5+2 | 3 | #D2 |
| NODE B | 5+2 | 2 | #B2 |
| NODE C | 5+3 | 2 | #C2 |

FIG. 13

| NODE NAME | METRIC VALUE | THE NUMBER OF NODES | ROUTE NAME |
|---|---|---|---|
| NODE B | 3 | 2 | #B3 |
| NODE A | 3+2 | 0 | #A3 |
| NODE D | 3+2+2 | 3 | #D3 |
| NODE C | 3+2+3 | 2 | #C3 |

FIG. 14

| NODE NAME | METRIC VALUE | THE NUMBER OF NODES | ROUTE NAME |
|---|---|---|---|
| NODE C | 1 | 2 | #C4 |
| NODE A | 1+3 | 0 | #A4 |
| NODE B | 1+3+2 | 2 | #B4 |
| NODE D | 1+3+2 | 3 | #D4 |

FIG. 15

$$V_i = \frac{\sum_{i=1}^{n}(V_{Mi} \times N_i)}{\sum_{i=1}^{n} N_i}$$

- n : THE NUMBER OF NODES
- $V_{Mi}$ : METRIC VALUE OF ROUTE FROM NODE X TO NODE i
- $N_i$ : THE NUMBER OF NODES ADJACENT TO NODE i + 1
- $V_i$ : AVERAGE METRIC VALUE OF ROUTE FROM NODE X TO NODE i VIA VIRTUAL CONNECTION i

FIG. 16

NODE A $$V_a = \frac{7 \times 4 + 5 \times 1 + 7 \times 3 + 8 \times 3}{4+1+3+3} = \frac{78}{11}$$

NODE B $$V_b = \frac{7 \times 4 + 5 \times 1 + 3 \times 3 + 8 \times 3}{4+1+3+3} = \frac{59}{11}$$

NODE C $$V_c = \frac{6 \times 4 + 4 \times 1 + 6 \times 3 + 1 \times 3}{4+1+3+3} = \frac{50}{11}$$

NODE D $$V_d = \frac{1 \times 4 + (1+2) \times 1 + (1+2+2) \times 3 + (1+2+3) \times 3}{4+1+3+3} = \frac{40}{11}$$

NETWORK NODE AND ASSOCIATED METHODOLOGY OF EXPANDING A NETWORK TOPOLOGY THROUGH PEER SELECTION

TECHNICAL FIELD

The present invention relates to a method for generating a network topology in which a new node joins a network formed by a plurality of nodes. The present invention also relates to a node which newly joins a network formed by a plurality of nodes.

BACKGROUND ART

Referring to FIGS. 1 to 5, a conventional method for generating a network topology (a method used in the "Gnutella") will be explained. To be more specific, an operation in which a node 105 newly joins a network including nodes 101 to 104.

First, as shown in FIG. 1, the node 105 selects a node 101 which IP address or URL the node 105 knows, among from a plurality of nodes 101 to 104 which forms the network, so as to establish a connection with the node 101.

Second, as shown in FIG. 2, the node 105 transmits a PING message including an IP address of the node 105 to the node 101.

Third, as shown in FIG. 3, the node 101 returns a PONG message including an IP address of the node 101 to the node 105, and transfers the PING message including the IP address of the node 105 to nodes 102 to 104.

Fourth, as shown in FIG. 4, each of the nodes 112 to 104 returns PONG messages Including respective IP addresses to the node 105.

The node 105 can acquire the IP address of nodes in the range designated in the TTL (Time to Live) field of the PING message, by repeating the above mentioned procedure.

Fifth, as shown in FIG. 5, the node 105 establishes connections with each of the nodes 101 to 104 which forms the network by referring to the IP address included in the received PONG messages.

Thus, the node 105 can newly join the network formed by the nodes 101 to 104.

As mentioned above, in the conventional method for generating a network topology, the new node 105 is configured to join the network randomly, by using the PING message and the PONG message.

However, In the conventional method for generating a network topology a network condition in a physical layer is not considered, upon generating a new network topology. Therefore, there is a possibility that a network delay is considerably large between adjacent nodes in a logical layer, and there is a possibility that data transfer efficiency is reduced in a newly generated network.

(Patent Literature 1) JP2003-304277

In viewing of the foregoing, it is an object of the present Invention to provide a network topology generation method and a node which can reduce a network delay fairly and minimally, upon generating a new network topology, by considering a network condition in a physical layer

DISCLOSURE OF INVENTION

A first aspect of the present invention is summarized as a node which newly joins a network formed by a plurality of nodes. The node includes a virtual connection establisher unit configured to establish virtual connections with the plurality of nodes; an average metric value calculator unit configured to calculate an average metric value of routes to the plurality of nodes via each of the virtual connections; and a connection establisher unit configured to establish a connect-on with the node to which the virtual connection having the smallest average metric value is established.

In the first aspects the node can further include an acquirer unit configured to acquire node-node connection information of an adjacent node to any node forming the network, from the any node. And, the average metric value calculator unit can be configured to calculate the average metric value in accordance with the node-node connection information.

In the first aspect, the node-node connection information can include a node ID for identifying the adjacent node, a metric value of a route between the any node and the adjacent node, and the number of nodes adjacent to the adjacent node.

In the first aspects the metric value can include at least one of the number of hops, network bandwidth communication costs, delay, loads MTU, or reliability.

In the first aspect, the acquirer unit can be configured to notify, to the any nodes a type of a metric value or a combination of metric values to be included in the node-node connection information A second aspect of the present invention is summarized as a method for generating a network topology in which a new node joins a network formed by a plurality of nodes. The method includes establishing a virtual connection between the new node and each of the plurality of nodes; calculating an average metric value of routes from the new node to the plurality of nodes via each of the virtual connections; and establishing a connection between the new node and the node to which the virtual connection having the smallest average metric value is established, so that the new node joins the network.

BRIEF DESCRIPTION OF THE DRAWING

FIG. 7 is a diagram showing an operation in which a node X according to the embodiment of the present invention newly joins a network;

FIG. 11 is a diagram showing information of routes from the node X to each node A to D via the virtual connection established between the node X according to the embodiment of the present Invention and the node D;

FIG. 12 is a diagram showing information of routes from the node X to each node A to D via the virtual connection established between the node X according to the embodiment of the present invention and the node A;

FIG. 13 is a diagram showing information of routes from the node X to each node A to D via the virtual connection established between the node X according to the embodiment of the present invention and the node B;

FIG. 14 is a diagram showing information of routes from the node X to each node A to D via the virtual connection established between the node X according to the embodiment of the present invention and the node C;

FIG. 15 is a diagram showing an expression with which the node X according to the embodiment of the present invention calculates an average metric value of routes to the nodes A to D via each virtual connection;

FIG. 16 is a diagram showing an example in which the node X according to the embodiment of the present invention calculates an average metric value of routes to the nodes A to D via each virtual connection.

BEST MODE FOR CARRYING OUT THE INVENTION

<A Configuration of a Node for Achieving a Network Topology Generation Method According to a First Embodiment of the Present Invention>

Figure 1:
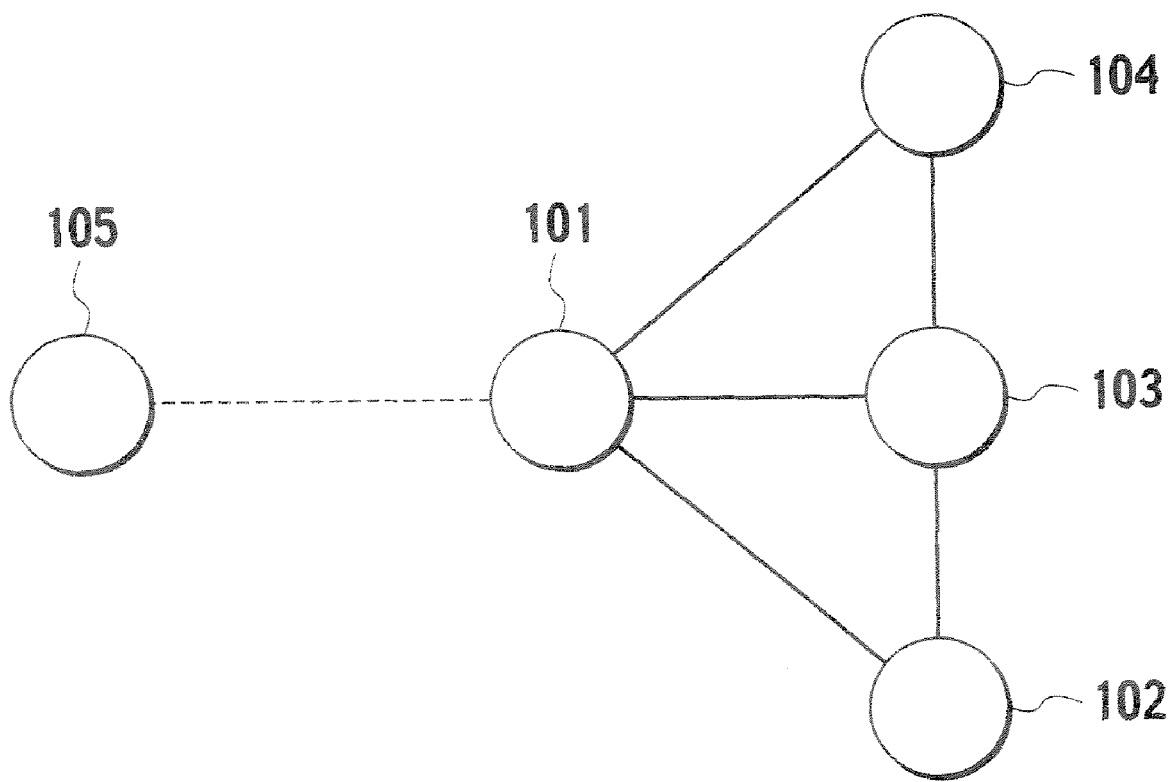
FIG. 1 is a diagram showing an operation in which a node 105 establishes a connection with a node 101, in a prior art.
Figure 2:
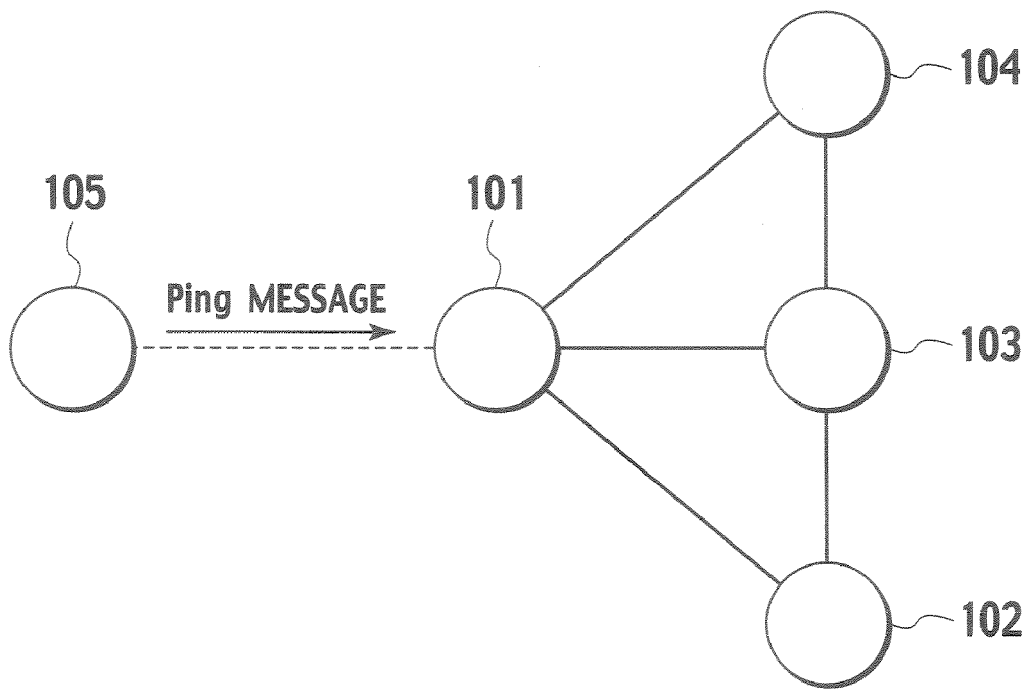
FIG. 2 is a diagram showing an operation in which the node 105 transmits a PING message to the node 101, in a prior art.
Figure 3:
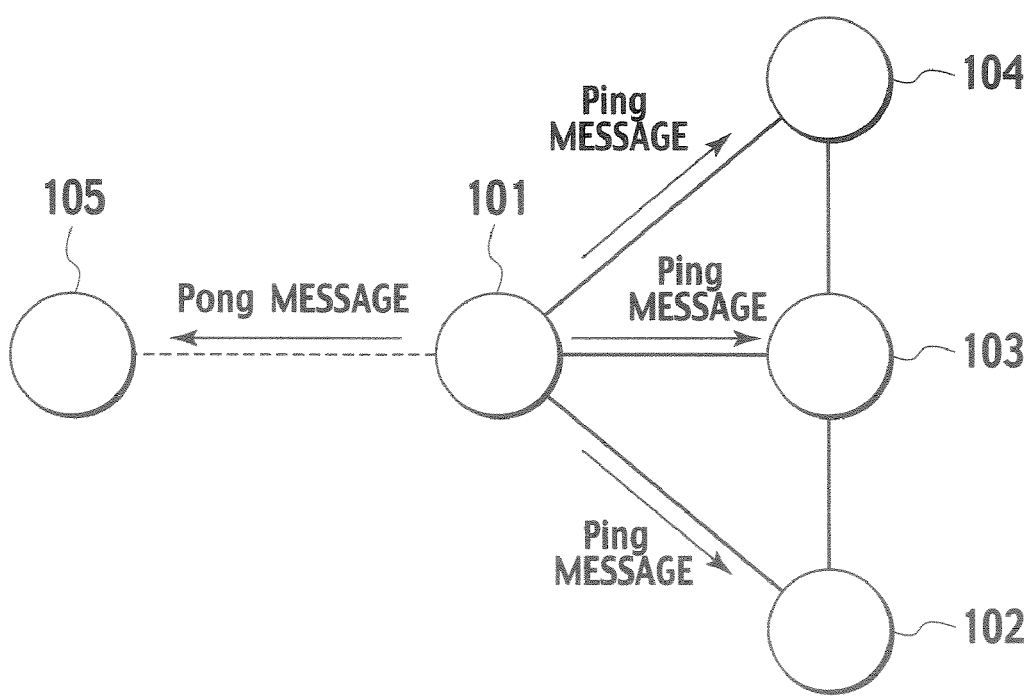
FIG. 3 is a diagram showing an operation in which the node 101 returns a PONG message to the node 105, and transmits the PING messages to nodes 102 to 104, in a prior art.
Figure 4:
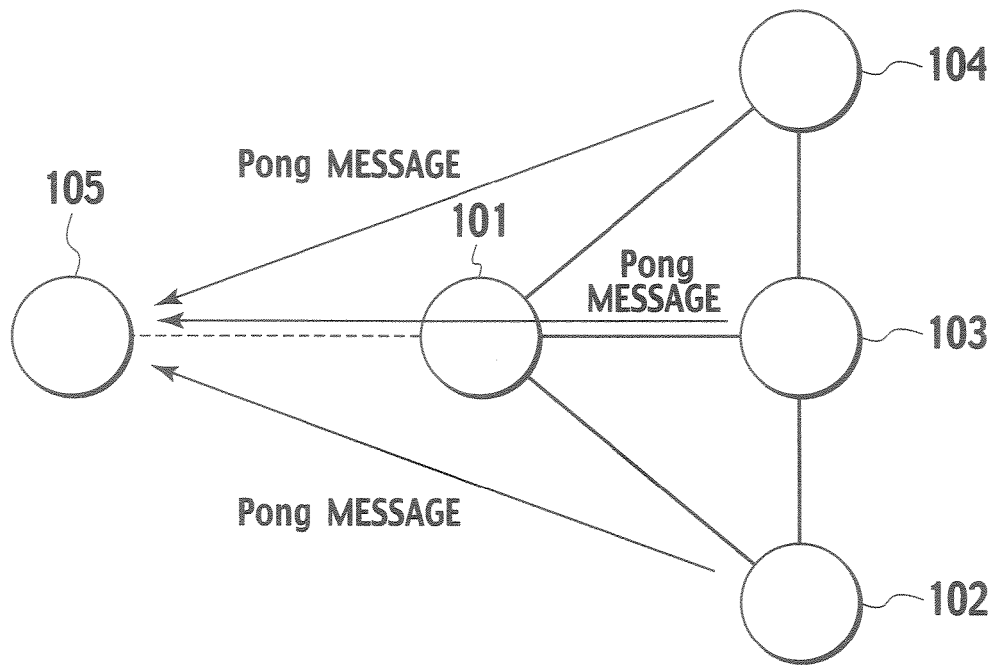
FIG. 4 is a diagram showing an operation in which each of the nodes 102 transmits PONG messages to the node 101, in a prior art.
Figure 5:
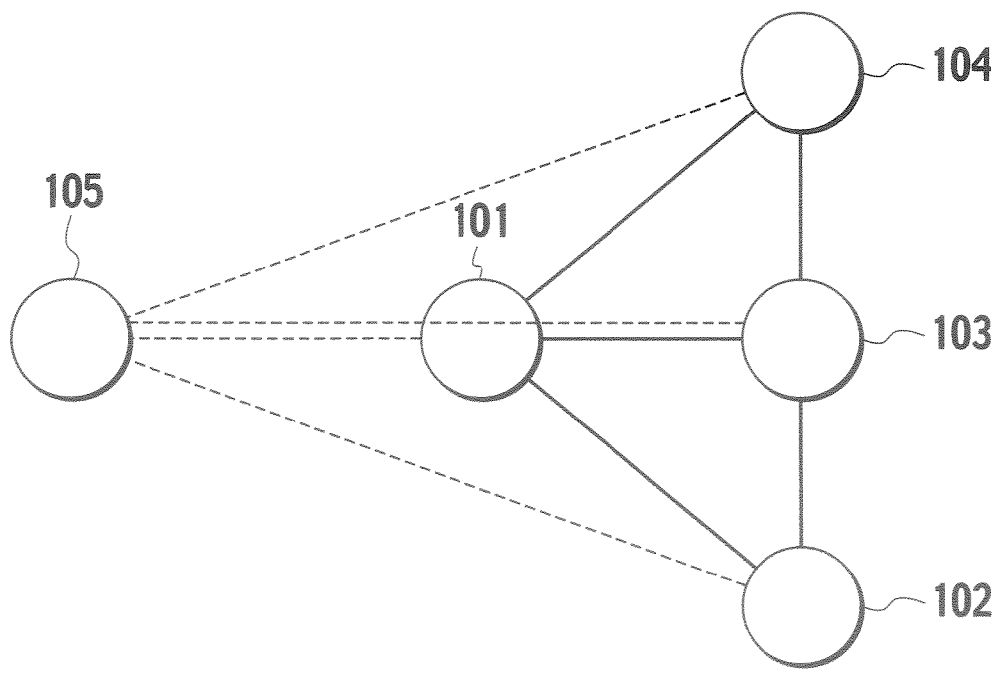
FIG. 5 is a diagram showing an operation in which the node 101 establishes connections with the nodes 102 to 104, in a prior art.
Figure 6A:
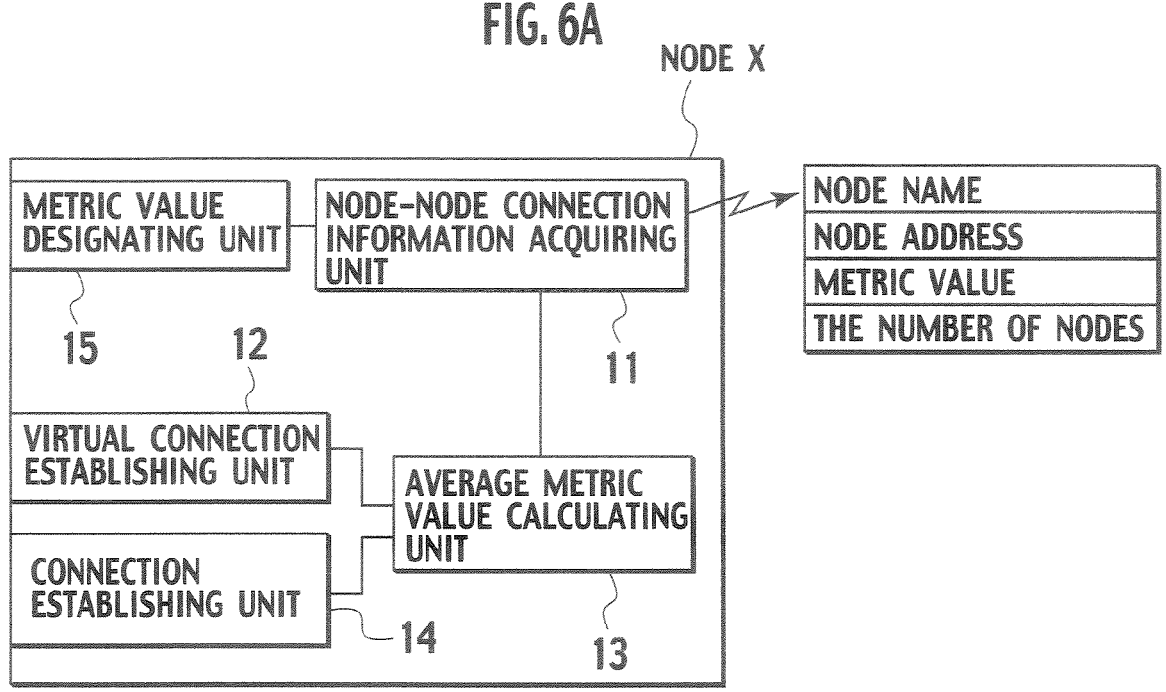
FIG. 6A is a functional block diagram of a node X according to one embodiment of the present invention.
Figure 6B:
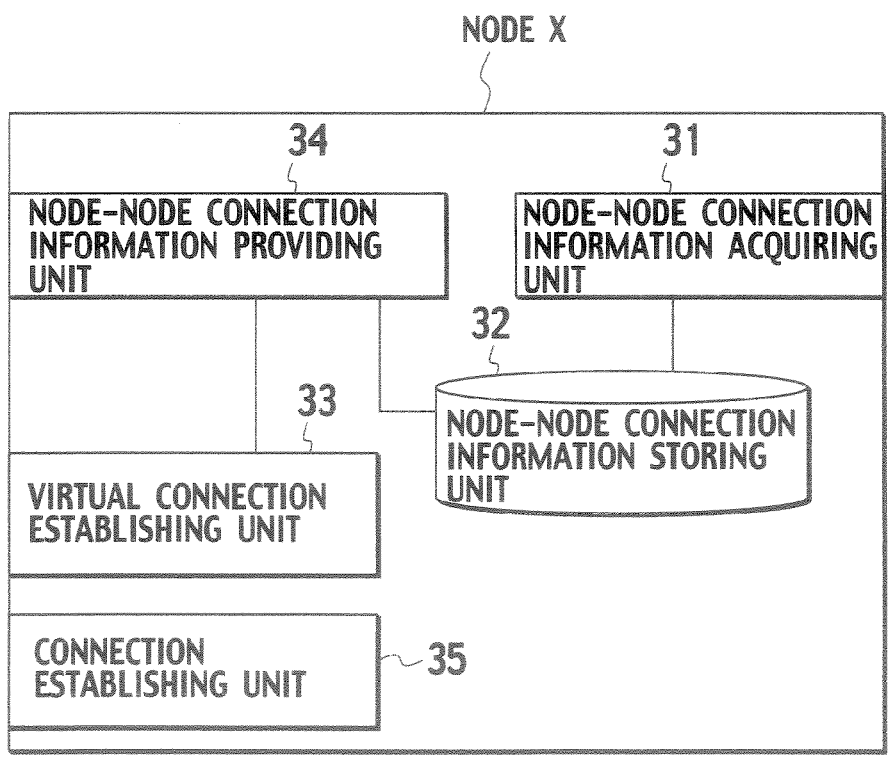
FIG. 6B is a functional block diagram of a node A according to one embodiment of the present invention.

Referring to FIGS. 6A and 6B, a configuration of a node for achieving a network topology generation method according to a first embodiment of the present invention will be described In this embodiment, a node X is configured to be able to newly loin a network including a plurality of nodes A to D.

As shown in FIG. 6A, a node X according to this embodiment includes a node-node connection information acquiring unit 11 a virtual connection establishing unit 12, an average metric value calculating unit 13, a connection establishing unit 14 and metric value designating unit 15.

The node-node connection information acquiring unit 11 is configured to acquire, from any node forming the network (for example, node A), node-node connection information of adjacent nodes (for example, nodes B to D) to the any node. Note that, the node-node connection information includes a "node name (node ID)" for identifying the adjacent node, a "node address (for examples an IP address)" of the adjacent nodes a "metric value" of a route between the any node and the adjacent node, and "the number of nodes" adjacent to the adjacent node. The metric value includes at least one of "the number of hops", "network bandwidth", "communication costs", "delay", "load", "MTU", or "reliability".

Here, "the number of hops" means the number of hops in a physical layer, in other words, the number of hops such as routers in a link established between the nodes. The "network bandwidth" means communication bandwidth (for example, 64 kbps) which is available in the link established between the nodes. The "communication costs" means communication fees of the link established between the nodes. The "delay" means a transmission delay time in the link established between the nodes. The "load" means usage condition (for example, 50%) in the link established between the nodes. The "MTU" means a size of minimum transfer block (MTU: Minimum Transfer Unit) used in the link established between the nodes. The "reliability" means a rate of occurrence of failure in the link established between the nodes.

The node-node connection information acquiring unit 11 can be configured to notify, to the any node, a type of a metric value or a combination of metric values designated by the metric value designating unit 15, when acquiring the node-node connect-on information form the any node.

The virtual connection establishing unit 12 is configured to establish virtual connections with a plurality of nodes A to D, by referring to node addresses included in the node-node connection information acquired by the node-node connection information acquiring unit 11.

The average metric value calculating unit 13 is configured to calculate an average metric value of routes to the plurality of nodes A to D via each of the virtual connections, by using the node-node connection information acquired by the node-node connection information acquiring unit 11. A specific method for calculating the average metric value will be described later.

The connection establishing unit 14 is configured to establish a connection with the node to which the virtual connection having the smallest average metric value is established.

The metric value designating unit 15 is configured to designate a type of a metric value (or a combination of metric values) to be included in the node-node connection information which is acquired from the any node, when the node X newly joins the network. When the metric value designating unit 15 does not designate a predetermined metric value, a metric value (or a combination of metric values) set as a default is included in the node-node connection information provided by the any node.

As shown in FIG. 6B, a node A according to this embodiment includes a node-node connection information acquiring unit 31, a node-node connection information storing unit 32, a virtual connection establishing unit 33, a node-node connection information providing unit 34 and a connection establishing unit 35.

The node-node connection information acquiring unit 31 is configured to acquire, from adjacent nodes (for example, nodes B to D) to the node X, node-node connection information of the adjacent nodes, in the network. A metric value in each link between nodes is updated arbitrarily.

For example, the node-node connection information acquiring unit 31 can be configured to acquire the updated result of the node-node connection information periodically, by broadcasting an update notification packet to all nodes in the network.

Moreover, the node-node connection information acquiring unit 31 can be configured to acquire the updated result of the node-node connection information periodically, by transmitting the update notification packet in a range which is set by TTL (Time To Live).

The node-node connection information storing unit 32 is configured to store the node-node connect-on information acquired by the node-node connection information acquiring unit 31.

The virtual connection establishing unit 33 is configured to establish a virtual link with the node X, in response to a virtual connection establishment request from the node X.

The node-node connection information providing unit 34 is configured to acquire, from the node-node connection information storing unit 32, the node-node connection information of adjacent nodes to the node A, and to provide the acquired node-node connection information to node X via the virtual connection established with the node X by the virtual connection establishing unit 33.

When the node-node connection information providing unit 34 is notified a type of a metric value (or a combination of metric values) by the node X, the node-node connection information providing unit 34 can be configured to provide the node-node connection information including the notified metric value (or combination of metric values).

When the node-node connection information providing unit 34 is not notified a type of a metric value (or a combination of metric values) by the node X, the node-node connection information providing unit 34 can be configured to provide the node-node connection information including the metric value (or combination of metric values) set as a default.

The connection establishing unit 35 is configured to establish a virtual connection with the node X, in response to a connection establishment request from the node X <An Operation of the Network Topology Generation Method According to the Embodiment>

Referring to FIGS. 7 to 17, an operation of the network topology generation method according to the embodiment will be explained. To be more specific an operation in which the node X newly joins the network including the nodes A to I will be explained.

Figures 8, 9:
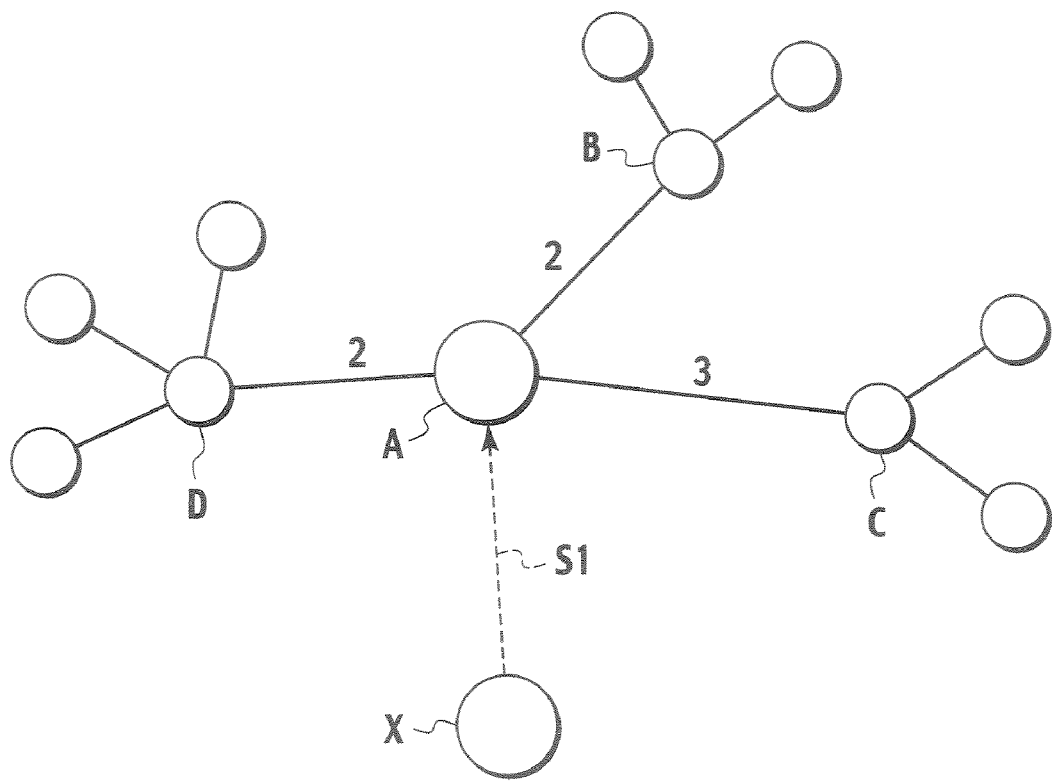
FIG. 8 is a diagram showing an operation in which the node X according to the embodiment of the present invention acquires node-node connection information from a node A.
FIG. 9 is a diagram showing an example of the node-node connection information acquired by the node X according to the embodiment of the present invention.

As shown in FIGS. 7 and 8, in step S1 the node-node connection information acquiring unit 11 of the node X acquires node-node connection information managed by the node A (the above described "any node"), From the node A. The node-node connection Information acquiring unit 11 of the node X can be configured to notify a type of a metric value or a combination of metric values to be included in the acquired node-node connection information.

FIG. 9 shows the node-node connection information managed by the node A in this embodiment. As shown in FIG. 9, the adjacent nodes to the node A is the nodes B to D.

Here, the node address of the node B is "$B_{IP}$", the node address of the node C is "$C_{IP}$", and the node address of the node D is "$D_{IP}$". The metric value between the node A and the node B is "2", the metric value between the node A and the node C is "3", and the metric value between the node A and the node D is "2". The number of nodes adjacent to the node B is "2", the number of nodes adjacent to the node C is "2", and the number of nodes adjacent to the node D is "3".

Figure 10:
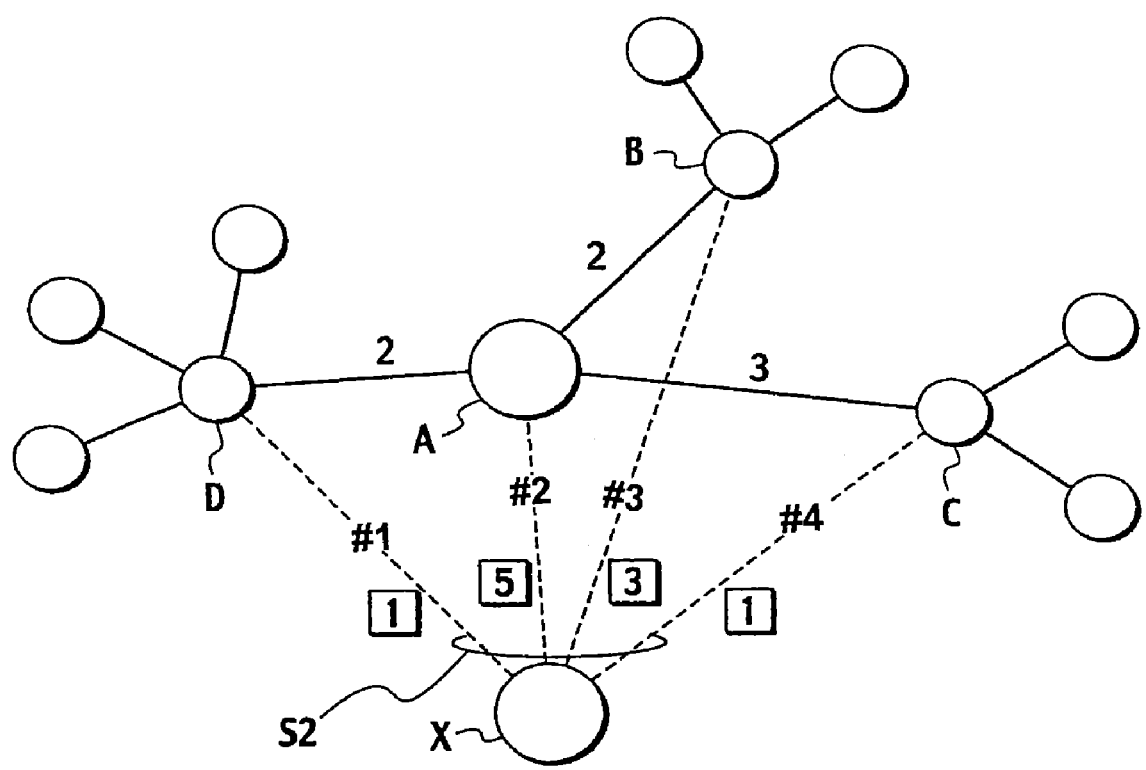
FIG. 10 is a diagram showing an operation in which the node X according to the embodiment of the present invention establishes virtual connections with nodes A to D.

As shown in FIGS. 7 and 10, in step S2, the virtual connection establishing unit 12 of the node X establishes virtual connections with the nodes A to D, in accordance with the "node addresses" included in the acquired node-node connection information.

In step S3, the average metric value calculating unit 13 of the node X calculates an average metric value of routes from the node C to each of the nodes A to D via each virtual connection, in accordance with the "metric values" and "the numbers of the nodes" included in the acquired node-node connection information.

To be more specific, the average metric value is calculated as follows.

Here, it is assumed that the metric value of the virtual connection #1 established between the node X and the node D is "1", the metric value of the virtual connection #2 established between the node X and the node A is "5", the metric value of the virtual connection #3 established between the node X and the node B is "3", and the metric value of the virtual connection #4 established between the node X and the node C is "1".

FIG. 11 shows route information for associating the "metric value" of the routes #A1 to #D1 from the node X to the each of the nodes A to D via the virtual connection #1, with "the number of nodes" adjacent to each of the nodes A to D.

FIG. 12 shows route information for associating the "metric value" of the routes #A2 to #D2 from the node X to the each of the nodes A to D via the virtual connection #2, with "the number of nodes" adjacent to each of the nodes A to D.

FIG. 13 shows route information for associating the "metric value" of the routes #A3 to #D3 from the node X to the each of the nodes A to D via the virtual connection #3, with "the number of nodes" adjacent to each of the nodes A to D.

FIG. 14 shows route information for associating the "metric value" of the routes #A4 to #D4 from the node X to the each of the nodes A to D via the virtual connection #4, with "the number of nodes" adjacent to each of the nodes A to D.

The average metric value calculating unit 13 calculates an average metric value $V_i$ of routes from the node X to the node i via each of the virtual connections #1 to #4 by the expression as shown in FIG. 15 with the route information as shown in FIGS. 11 to 14.

In the expression shown in FIG. 15, "n" means the total number of nodes belonging to the network, "$V_{Mi}$" means a metric value of a route from the node X to the node i, and "$N_i$" means a value calculated by adding "1" to the number of nodes adjacent to the node i.

Here it is assumed that the node A corresponds to the node 1, the node B corresponds to the node 2, the node C corresponds to the node 3, and the node D corresponds to the node 4.

FIG. 16 shows an example of a situation where the average metric value calculating unit 13 of the node X calculates the average metric value of routes from the node X to each of the nodes A to D via each of the virtual connections #1 to #4, by referring to the route Information as shown in FIGS. 11 to 14.

As shown in FIG. 16 the average metric value of the routes from the node X to the each of the nodes A to D via the virtual connection #2 established between the node X and the node A is "78/11".

The average metric value of the routes from the node X to the each of the nodes A to D via the virtual connection #3 established between the node X and the node B is "59/11" The average metric value of the routes from the node X to the each of the nodes A to D via the virtual connection #4 established between the node X and the node C is "50/11".

The average metric value of the routes from the node X to the each of the nodes A to D via the virtual connection #1 established between the node X and the node D is "40/11".

Figure 17:
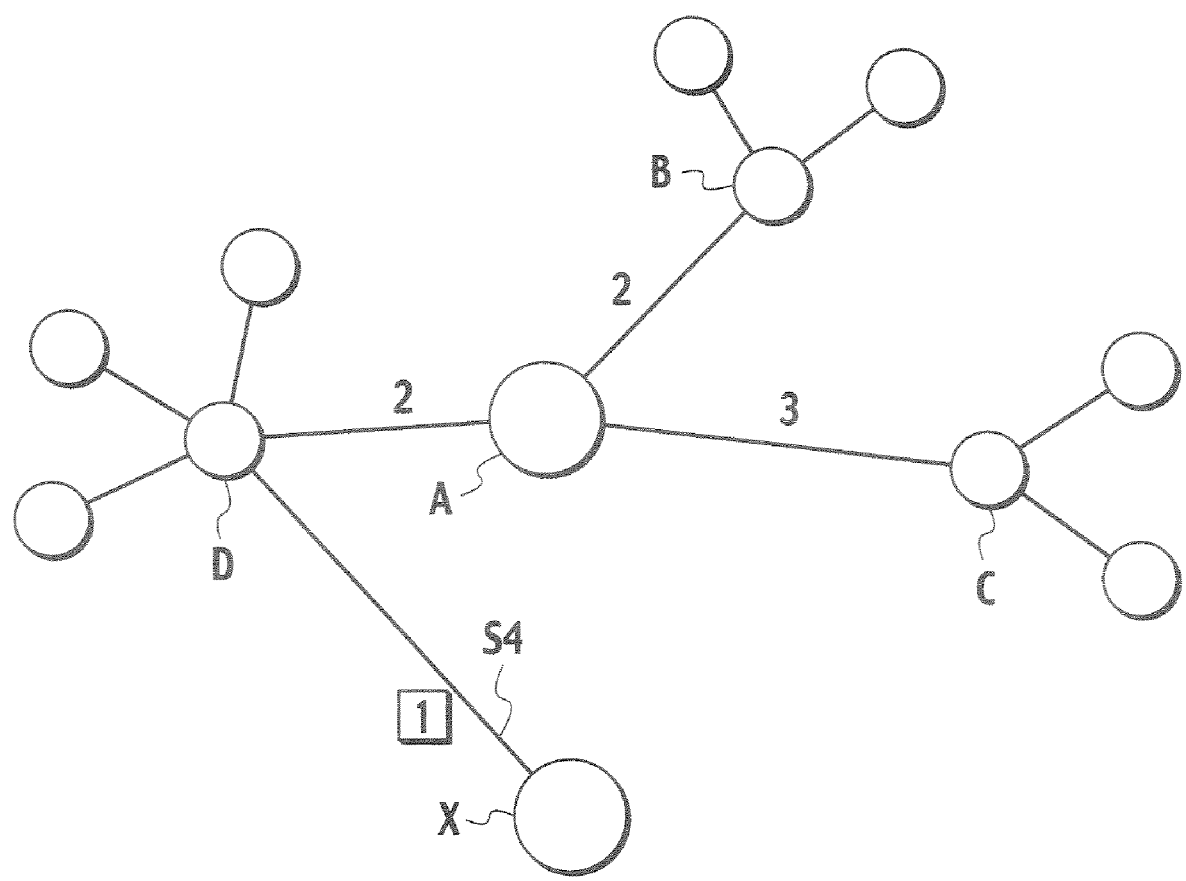
FIG. 17 is a diagram showing an operation in which the node X according to the embodiment of the present invention establishes a connection with the node D.

As a result in step S4, the connection establishing unit 14 of the node X establishes a connection with the node D to which the virtual connection #1 having the smallest average metric value ("40/11") is established as shown in FIG. 17.

As a result, the node X joins the network and the network topology is changed. In other words, the node X can communicate with all nodes in the network such as the nodes A to D, via the virtual connection #1.

<Functions and Effects of the Network Topology Generation Method According to the Embodiment>

According to the network topology generation method of the embodiment, the connection establishing unit 14 of the node X establishes a connection with the node D to which the virtual connection #1 is established, so that the average metric value calculated by considering the network condition in the physical layer is the smallest. Therefore, it is possible to reduce the network delay fairly and minimally, upon generating a new network topology.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

INDUSTRIAL APPLICABILITY

The present invention can provide a network topology generating method and a node which can reduce a network delay fairly and minimally, upon generating a new network topology, by considering a network condition in a physical layer

The invention claimed is:

1. A node device which newly joins a network formed by a first existing node and a second existing node, the node device comprising:
   a processor;
   a memory;
   a virtual connection establisher unit configured to establish a first virtual connection with the first existing node and configured to establish a second virtual connection with the second existing node;
   a total metric value calculator unit configured to calculate a first total metric value for the first virtual connection and configured to calculate a second total metric value for the second virtual connection; and
   a connection establisher unit configured to establish a connection with only the first existing node when the first total metric value is smaller than the second total metric value, and configured to establish a connection with only the second existing node when the second total metric value is smaller than the first total metric value,
   wherein when calculating the first total metric value, the total metric value calculator calculates a first weighted metric value as a product of a metric value of the first virtual connection to the first existing node and a first weighting coefficient representing a number of adjacent nodes to the first existing node, the total metric value calculator also calculates a second weighted metric value as a product of a metric value of a route to the second existing node via the first virtual connection and the first existing node and a second weighting coefficient representing a number of adjacent nodes to the second existing node, and the first total metric value is calculated as a sum of the first weighted metric value and the second weighted metric value divided by the sum of the first and second weighting coefficients, and
   when calculating the second total metric value, the total metric value calculator calculates a third weighted metric value as a product of a metric value of the second virtual connection to the second existing node and the second weighting coefficient, the total metric value calculator also calculates a fourth weighted metric value as a product of a metric value of a route to the first existing node via the second virtual connection and the second existing node and the first weighting coefficient, and the second total metric value is calculated as a sum of the third weighted metric value and the fourth weighted metric value divided by the sum of the first and second weighting coefficients.

2. The node device according to claim 1, further comprising:
   an acquirer unit configured to acquire, from at least one of the first existing node and the second existing node, a node-node connection information of an adjacent node to one of the first existing node and the second existing node forming the network,
   wherein the weighted metric value calculator unit is configured to calculate the weighted metric value in accordance with the node-node connection information.

3. The node device according to claim 2, wherein the node-node connection information includes a node ID for identifying the adjacent node, a metric value of a route between each of the first existing node and the second existing node to the adjacent node, and a number of nodes adjacent to the adjacent node.

4. The node device according to claim 3, wherein the metric value includes at least one of a number of hops, network bandwidth, communication costs, delay, load, MTU, or reliability.

5. The node device according to claim 3, wherein the acquirer unit is configured to notify the first existing node and the second existing node of a type of a metric value or a combination of metric values to be included in the node-node connection information.

6. A method for generating a network topology in which a new node device joins a network formed by a first existing node and a second existing node, the method comprising:
   establishing a first of virtual connection between the new node device and the first existing node and a second virtual connection between the new node device and the second existing node;
   calculating a first total metric value for the first virtual connection and a second total metric value for the second virtual connection; and
   establishing a connection between the new node device and only the first existing node when the first total metric value is smaller than the second total metric value; and
   establishing a connection between the new node device and only the second existing node when the second total metric value is smaller than the first total metric value,
   wherein when the first total metric value is calculated, a first weighted total metric value is calculated as a product of a metric value of the first virtual connection between the new node device and the first existing node and a first weighting coefficient representing a number of adjacent nodes to the first existing node, a second weighted metric value is also calculated as a product of a metric value of a route from the new node device to the second existing node via the first virtual connection and the first existing node and a second weighting coefficient representing a number of adjacent nodes to the second existing node, and the first total metric value is calculated as a sum of the first weighted metric value and the second weighted metric value divided by the sum of the first and second weighting coefficients, and
   when the second total metric value is calculated, a third weighted metric value is calculated as a product of a metric value of the second virtual connection from the new node device to the second existing node and the second weighting coefficient, a fourth weighted metric value is also calculated as a product of a metric value of a route from the new node device to the first existing node via the second virtual connection and the second existing node and the first weighting coefficient, and the second total weighted metric value is calculated as a sum of the third weighted metric value and the fourth weighted metric value divided by the sum of the first and second weighting coefficients.

7. The node device according to claim 1, wherein the acquirer unit periodically acquires updated node-node connection information by broadcasting an update notification to the first existing node and the second existing node.

8. The method according to claim 6, further comprising:
   periodically acquiring node-node connection information by broadcasting an update message to the first existing node and the second existing node.

* * * * *